Jan. 14, 1958  J. P. FOREMAN  2,819,930
APPARATUS FOR REMOVING DUST
Filed Oct. 14, 1953
Fig. 1.
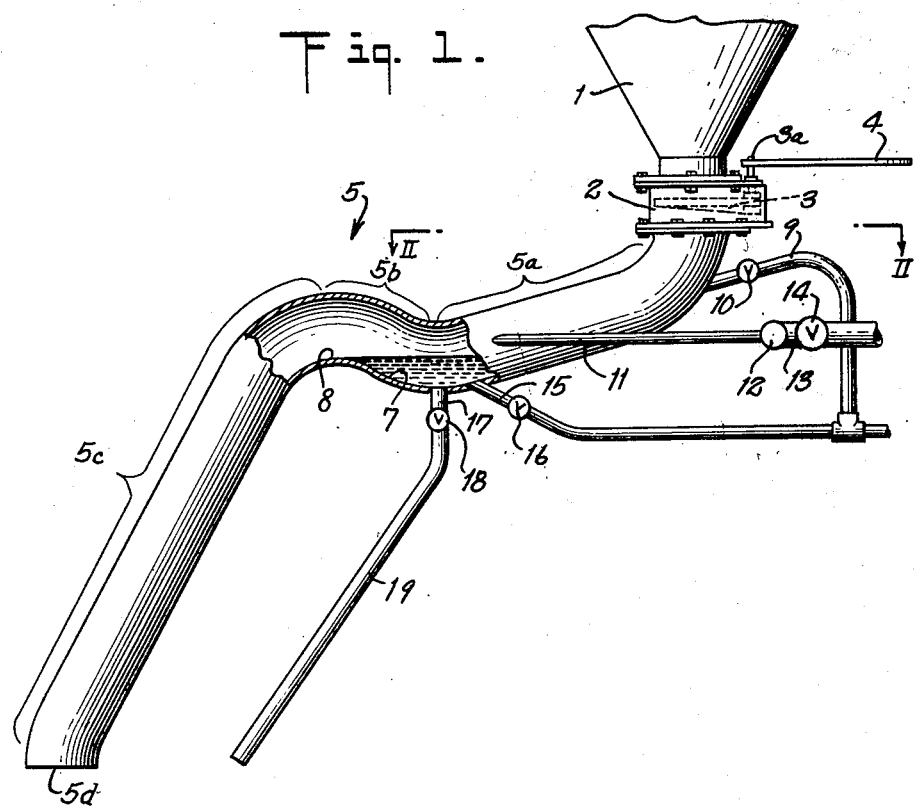
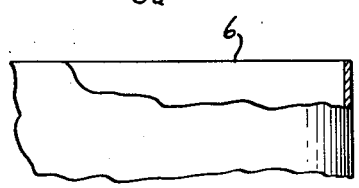
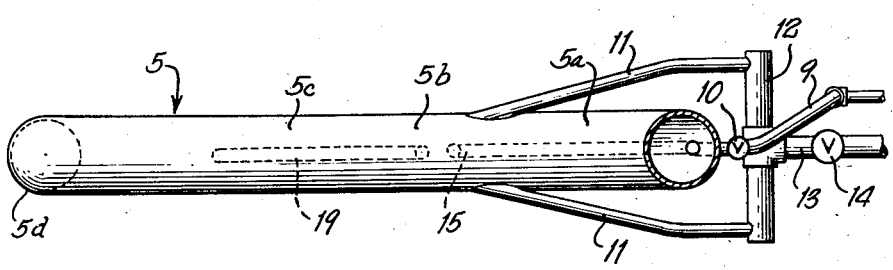
Fig. 2.
INVENTOR.
JAMES P. FOREMAN
BY
Robert S. Dunham
ATTORNEY

United States Patent Office 2,819,930
Patented Jan. 14, 1958

2,819,930
APPARATUS FOR REMOVING DUST

James P. Foreman, Poland, Ohio, assignor to Republic Steel Corporation, Cleveland, Ohio, a corporation of New Jersey Application October 14, 1953, Serial No. 386,044

6 Claims. (Cl. 302—20)

This invention relates to a method and apparatus for removing dust which has been collected in a hopper, bin or the like, and especially to apparatus for wetting such dust so that it may be removed in a moistened condition, for example as a mud or sludge, and will not be dispersed in the atmosphere during removal.

Many industrial processes result in the formation of dust which is collected in hoppers or bins by means of baffle arrangements, or the like. A typical process is the cleaning of the gas stream in a blast furnace by conventional dust catcher gas cleaning apparatus. Some dusts can be removed from such a collecting hopper or bin by simple gravity flow. However, it is practically necessary in such dust removing systems finally to discharge the dust into some vehicle, for example a railroad car. Even the best simple gravity system results in an objectionable spreading of the dust into the air. In some cases the dust may be poisonous, in which cases it is very important to make sure that none of it is spread in the air. In other cases, the dust may contain valuable components such as the mineral dusts which are collected in many smelting processes.

An object of the invention is to provide an improved method and apparatus for removing dust from a closed container and discharging it as a mud or sludge.

Another object is to provide apparatus in which the dust may be removed completely and rapidly.

Another object is to provide a method and apparatus of the type described which is readily controllable so as to ensure that the product discharged is neither too dry nor too wet.

A further object is to provide a method and apparatus of the type described which is simple and inexpensive.

The foregoing and other objects of the invention are attained by conveying the dust from the bin through a shallow basin. One or more streams of water are directed into the basin with the dust so that it becomes thoroughly mixed with the water in the basin. A steam jet is provided for carrying the dust stream from the hopper into the basin, and another steam jet is provided for ejecting the mixed mud or sludge from the basin.

Other objects and advantages of the invention will become apparent from a consideration of the following specification, taken together with the accompanying drawing, in which:

Fig. 1 is a partly diagrammatic elevational view of dust removing apparatus embodying the invention;

Fig. 2 is a view taken on the line II—II of Fig. 1, looking in the direction of the arrows.

Referring to the drawing, there is shown a dust collecting hopper 1 whose lower end is in communication with a casing 2 enclosing a horizontally slidable valve 3 pivoted at 3a and operable by a lever 4. The bottom end of the casing 2 is in communication with a conduit 5 which has a first section 5a extending diagonally downward, a second section joining 5b the first section in a wide upright U-shaped bend and extending diagonally upward therefrom, and a third section 5c joining the second section in a wide inverted U-shaped bend and extending downwardly therefrom to a discharge opening 5d which may be conveniently located above a railroad track so that a receiving car 6 may be run under the discharge opening. The lower portion of the bend at the junction of sections 5a and 5b forms a basin 7, and the lower portion of the inverted U-shaped bend at the junction of sections 5b and 5c forms a sill 8 which defines the outlet of the basin. The vertical distance between the bottom of the basin 7 and the sill 8 is less than the diameter of the conduit 5, being approximately one-half of that diameter. Conduit 5 is, as shown in the drawing, of substantially constant cross-sectional area throughout its length, and therefore provides a substantially unrestricted path of flow for material moving through it.

Near the upper end of the section 5a, a steam pipe 9, controlled by a valve 10, opens into the conduit 5, being arranged to direct a jet of steam substantially along the axis of the diagonally downwardly directed portion 5a of the conduit 5.

On each side of the conduit 5, above the upstream end of the basin 7 are provided two water inlet pipes 11, which are supplied from a common manifold 12 through a pipe 13 controlled by a valve 14.

Another steam inlet pipe 15 controlled by a valve 16 opens into the basin 7 near the bottom thereof and is directed substantially along the axis of the diagonally upward arm of the U-shaped bend 5b. A drain conduit 17 is provided at the bottom of the basin 7. This drain conduit is controlled by a valve 18 and connects with a drain line 19 which extends diagonally to a point above the railroad car 6.

Operation

When the apparatus is not operating, all the valves are closed. In order to empty the bin 1, the steam valve 10 is first opened, so as to establish a moving fluid current toward the basin 7. The steam valve 16 is next opened to establish a moving fluid current from the basin 7 toward the discharge opening 5d. The slide valve 3 is then opened by means of the lever 4 and the dust starts moving through the conduit 5. The water valve 14 is then opened to the degree required to moisten the dust satisfactorily.

The basin 7 creates an eddy in the flow of dust and fluid through the conduit 5 and mixes the dust and water thoroughly. The steam ejector nozzle 15 ensures that no material accumulates at the bottom of basin 7, and prevents settling of heavier components in that locality.

It has been found that the arrangements shown permits the removal of a wide variety of dust materials of varying degrees of fineness, and that the materials are thoroughly mixed before they are discharged. The location of the sill 8 substantially below the top of the portion of the conduit section 5b ensures that the material passing through the discharge section of the conduit cannot establish a siphon action so as to drag from the basin 7 materials which have not been thoroughly mixed.

The steam jet issuing from the pipe 9 at the upper end of the conduit section 5a ensures that the dust falling from the hopper flows to the basin 7. It also gives to the dust particles in that section of the conduit a downward momentum which effectively carries substantially all of them into the water pool which exists at the bottom of the basin 7.

The steam jet issuing from nozzle 15 tends to supply the discharge section of the conduit with material from the bottom of the basin, so that the material entering the basin passes down into the bottom and mixes with water before it is ejected, rather than being drawn through the top of the conduit above the water surface.

The jet of steam from the pipe 9 is controlled to move sufficiently fast so that it has more than enough capacity to entrain all the dust entering the upper end of pipe section 5a. This entrained material is carried by the jet into direct contact with the pool of water in the basin 7. Because of the high speed of the central steam jet, a counter-current flow develops in the peripheral parts of the pipe. Any dust particles not entrained by the jet when they first enter the pipe are carried by this counter-current flow back to the mouth of the pipe 9, in a sort of eddy, until they are entrained by the jet.

A similar action takes place at the jet issuing from pipe 15. This jet is controlled to have more than enough capacity to entrain all the mud or slurry which gathers in the basin 7. Any mud particles not entrained by the jet fall back into the basin 7 until they are so entrained.

It will be recognized that during operation, a very turbulent condition exists in the basin 7, and that the liquid therein does not then have the smooth level surface illustrated in the drawing, but that the entire region is filled with a turbulent mixture of dust, water, steam, vapor and mud. The only orderly localities in the region are those where the steam jets are strong enough to prevail over the other forces acting.

Many modifications of the structure shown may be made. The basin 7 and the sill 8 may, for example, take on many forms other than the one disclosed. The steam nozzles 9 and 15 are shown as directed axially of the conduit sections 5a and 5b, respectively. While this directional relationship is greatly to be preferred, many of the benefits of the invention may be secured as long as these nozzles are directed substantially parallel to the respective conduit sections. While the water inlet arrangement shown is presently preferred, many modifications may be made in this arrangement as to direction, location and number of inlet pipes.

Many other modifications thereof will readily occur to those skilled in the art and I therefore intend my invention to be limited only by the appended claims.

I claim:

1. Dust removing apparatus, comprising a hopper to collect dust in bulk, a pipe connected to the bottom of the hopper and having a first section extending diagonally downward from the hopper and providing a path for the flow of dust, a second section joining said first section in a wide upright U-shaped bend and extending diagonally upward therefrom, and a third section joining said second section in a wide inverted U-shaped bend and extending downwardly therefrom to a discharge outlet opening to the atmosphere, said upright U-shaped bend defining a basin and said inverted U-shaped bend defining an overflow sill for said basin, the vertical distance between the bottom of said basin and said sill being substantially less than the diameter of said first and second sections, at least one water inlet nozzle opening into said first section above the level of said sill and directed toward the middle of said first section, and a steam inlet nozzle opening into said basin upstream from the lowest point thereof and below said sill and directed generally upwardly toward a point above said sill.

2. Dust removing apparatus as defined in claim 1, including a second steam inlet nozzle opening into said first pipe section adjacent the upper end thereof and directed generally parallel thereto.

3. Dust removing apparatus as defined in claim 1, including two water inlets opening into said first section at diametrically opposite localities.

4. Dust removing apparatus, comprising a hopper to collect dust in bulk, a pipe connected to the bottom of the hopper and having a first section extending diagonally downward from the hopper and providing a path for the flow of dust, a second section joining said first section in a wide upright U-shaped bend and extending diagonally upward, and a third section joining said second section in a wide inverted U-shaped bend and extending downwardly to a discharge outlet opening to the atmosphere, said U-shaped bend defining a basin and said inverted U-shaped bend defining an overflow sill for said basin, the vertical distance between the bottom of said basin and said sill being substantially less than the diameter of said first and second sections, at least one water inlet nozzle opening into said first section above the level of said sill and directed toward the middle of said first section, a steam inlet nozzle opening into said basin upstream from the bottom thereof and below said sill and directed generally parallel to said second section of pipe, a second steam inlet nozzle opening into said first pipe section adjacent the upper end thereof and directed generally parallel thereto, and independently operable valves controlling the flow through said nozzles.

5. Apparatus for removing dust from a hopper or the like, comprising closed conduit means providing a path for flow of said dust from said hopper and including a portion contoured to tend to create an eddy in the material flowing therethrough, means to discharge water into said conduit means and directed toward the middle thereof just upstream from said eddy, and tending to form a turbulent pool of water at said portion of said conduit means, and means to discharge a jet of steam into said eddy to expel material from said portion of said conduit means, said contoured portion having a depth substantially less than the diameter of said closed conduit means.

6. Apparatus for removing dust from a hopper containing dust in bulk, comprising conduit means connected to the hopper bottom to receive dust by gravity therefrom, first steam jet means opening into said conduit means adjacent said hopper bottom and effective to create in said conduit means a flow of steam entraining the dust from said hopper, means to discharge water into said conduit means and toward the middle thereof and effective to create a curtain of water across said conduit, mixing means including a sill in said conduit means in the path of the flowing water and steam, the vertical distance between the bottom of said mixing means and said sill being less than the diameter of said conduit means, said mixing means being adapted to mix turbulently the water and the dust flowing through said conduit means, and second steam jet means opening into said mixing means and directed toward the outlet of the conduit means, said second steam jet means being effective to discharge mixed material from said mixing means.

References Cited in the file of this patent

UNITED STATES PATENTS

| 2,430,278 | Daniels | Nov. 4, 1947 |
| 2,617,690 | Addison | Nov. 11, 1952 |
| 2,648,572 | Thorsten | Aug. 11, 1953 |

FOREIGN PATENTS

| 398,062 | Great Britain | Sept. 7, 1933 |
| 752,201 | France | Sept. 19, 1933 |